United States Patent
Hoek et al.

(10) Patent No.: US 10,456,755 B2
(45) Date of Patent: Oct. 29, 2019

(54) POLYANILINE MEMBRANES FORMED BY PHASE INVERSION FOR FORWARD OSMOSIS APPLICATIONS

(71) Applicant: The Regents of the University of California, Oakland, CA (US)

(72) Inventors: Eric M. V. Hoek, Pacific Palisades, CA (US); Mavis C. Y. Wong, Canoga Park, CA (US); Richard B. Kaner, Pacific Palisades, CA (US)

(73) Assignee: The Regents of the University of California, Oakland, CA (US)

( * ) Notice: Subject to any disclaimer, the term of this patent is extended or adjusted under 35 U.S.C. 154(b) by 615 days.

(21) Appl. No.: 14/891,010

(22) PCT Filed: May 15, 2014

(86) PCT No.: PCT/US2014/038155
§ 371 (c)(1),
(2) Date: Nov. 13, 2015

(87) PCT Pub. No.: WO2014/186552
PCT Pub. Date: Nov. 20, 2014

(65) Prior Publication Data
US 2016/0082399 A1    Mar. 24, 2016

Related U.S. Application Data

(60) Provisional application No. 61/823,739, filed on May 15, 2013.

(51) Int. Cl.
*B01D 71/60* (2006.01)
*B01D 61/00* (2006.01)
(Continued)

(52) U.S. Cl.
CPC .......... *B01D 71/60* (2013.01); *B01D 61/002* (2013.01); *B01D 67/0009* (2013.01);
(Continued)

(58) Field of Classification Search
CPC ..................................................... B01D 71/60
See application file for complete search history.

(56) References Cited

U.S. PATENT DOCUMENTS

| | | | |
|---|---|---|---|
| 4,504,529 | A | 3/1985 | Sorensen et al. |
| 4,976,860 | A | 12/1990 | Takahashi et al. |

(Continued)

FOREIGN PATENT DOCUMENTS

| | | |
|---|---|---|
| CA | 1148834 A1 | 6/1983 |
| CN | 101274221 A | 10/2008 |

(Continued)

OTHER PUBLICATIONS

International Search Report dated Sep. 25, 2014, from PCT/US2014/038155.

(Continued)

*Primary Examiner* — Michael M Dollinger
(74) *Attorney, Agent, or Firm* — Foley Hoag LLP; David P. Halstead; Alexander J. Chatterley

(57) ABSTRACT

Disclosed herein are forward osmosis (FO) membranes comprising polyaniline. Methods of making the membranes, including methods of tuning the properties of the membranes by post-casting treatments, and methods of using the membranes in FO applications are also described.

25 Claims, 17 Drawing Sheets

(51) Int. Cl.
    *B01D 67/00*         (2006.01)
    *B01D 69/02*         (2006.01)
    *B01D 69/10*         (2006.01)
    *C02F 1/44*          (2006.01)
    *C02F 103/08*       (2006.01)

(52) U.S. Cl.
    CPC ............ *B01D 69/02* (2013.01); *B01D 69/10* (2013.01); *C02F 1/445* (2013.01); *B01D 2323/08* (2013.01); *B01D 2323/22* (2013.01); *B01D 2325/04* (2013.01); *B01D 2325/20* (2013.01); *C02F 2103/08* (2013.01); *Y02A 20/131* (2018.01)

(56) References Cited

U.S. PATENT DOCUMENTS

| | | | |
|---|---|---|---|
| 5,096,586 A * | 3/1992 | Kaner ................. | B01D 53/228 |
| | | | 210/500.37 |
| 5,156,780 A | 10/1992 | Kenigsberg et al. | |
| 5,234,453 A | 8/1993 | Smith et al. | |
| 5,358,556 A | 10/1994 | Kaner et al. | |
| 5,916,485 A | 6/1999 | Besenhard et al. | |
| 5,981,695 A | 11/1999 | Mattes et al. | |
| 6,429,282 B1 | 8/2002 | Wang et al. | |
| 6,465,120 B1 | 10/2002 | Akita et al. | |
| 6,797,325 B2 | 9/2004 | Wang et al. | |
| 7,033,639 B2 | 4/2006 | Kelly et al. | |
| 7,160,575 B1 | 1/2007 | Pinto et al. | |
| 7,250,189 B2 | 7/2007 | Ji et al. | |
| 7,309,385 B2 | 12/2007 | Hong et al. | |
| 7,455,891 B2 | 11/2008 | Kunz et al. | |
| 7,510,658 B2 | 3/2009 | Gordon | |
| 7,535,019 B1 | 5/2009 | Sager et al. | |
| 7,601,263 B2 | 10/2009 | Ebert et al. | |
| 7,780,875 B2 | 8/2010 | Asgari | |
| 7,850,798 B2 | 12/2010 | Kaner et al. | |
| 8,079,480 B2 | 12/2011 | Haring et al. | |
| 8,101,709 B1 | 1/2012 | Kaner et al. | |
| 8,470,203 B2 | 6/2013 | Kaner et al. | |
| 8,664,357 B2 | 3/2014 | Livingston et al. | |
| 9,017,773 B2 | 4/2015 | D'Arcy et al. | |
| 9,278,319 B2 | 3/2016 | Hoek et al. | |
| 10,265,662 B2 | 4/2019 | Hoek et al. | |
| 2003/0136727 A1 | 7/2003 | Yamada et al. | |
| 2003/0138619 A1 | 7/2003 | David et al. | |
| 2003/0162939 A1* | 8/2003 | Wang ................ | C08G 73/0266 |
| | | | 528/422 |
| 2005/0131139 A1 | 6/2005 | Kaner et al. | |
| 2005/0238804 A1 | 10/2005 | Garbar et al. | |
| 2006/0284218 A1 | 12/2006 | Kaner et al. | |
| 2007/0007515 A1 | 1/2007 | Suh et al. | |
| 2007/0108420 A1 | 5/2007 | Kuramoto | |
| 2008/0048996 A1 | 2/2008 | Hu et al. | |
| 2008/0185294 A1 | 8/2008 | Cai et al. | |
| 2008/0203012 A1 | 8/2008 | Yeager et al. | |
| 2009/0305055 A1 | 12/2009 | Shimizu | |
| 2010/0025892 A1 | 2/2010 | Jones et al. | |
| 2010/0051538 A1 | 3/2010 | Freeman et al. | |
| 2010/0091275 A1 | 4/2010 | Wang et al. | |
| 2010/0092809 A1 | 4/2010 | Drzal et al. | |
| 2010/0224555 A1 | 9/2010 | Hoek et al. | |
| 2010/0300488 A1 | 12/2010 | Watanabe et al. | |
| 2010/0307974 A1 | 12/2010 | Pettinger et al. | |
| 2011/0073540 A1 | 3/2011 | McGinnis et al. | |
| 2011/0212027 A1 | 9/2011 | Hoare et al. | |
| 2011/0240556 A1* | 10/2011 | Hoek ................. | B01D 67/0011 |
| | | | 210/650 |
| 2011/0278175 A1 | 11/2011 | Whitcombe et al. | |
| 2011/0287551 A1 | 11/2011 | Weiller et al. | |
| 2012/0012520 A1 | 1/2012 | Lee et al. | |
| 2012/0043274 A1* | 2/2012 | Chi ................... | B01D 67/0006 |
| | | | 210/490 |
| 2012/0111791 A1 | 5/2012 | Freeman et al. | |
| 2012/0248031 A1 | 10/2012 | Kerres et al. | |
| 2012/0255897 A1 | 10/2012 | Lu et al. | |
| 2013/0020243 A1 | 1/2013 | Han et al. | |
| 2015/0273404 A1 | 10/2015 | Hoek et al. | |
| 2015/0273521 A1 | 10/2015 | D'Arcy et al. | |
| 2016/0082399 A1 | 3/2016 | Hoek et al. | |
| 2016/0136585 A1 | 5/2016 | Hoek et al. | |
| 2017/0050153 A1 | 2/2017 | Hoek et al. | |

FOREIGN PATENT DOCUMENTS

| | | |
|---|---|---|
| CN | 101786768 A | 7/2010 |
| CN | 102258950 A | 11/2011 |
| DE | 19916802 A1 | 10/2001 |
| EP | 1466934 A1 | 10/2004 |
| EP | 1792948 A1 | 6/2007 |
| JP | H02220373 A | 9/1990 |
| JP | H0414869 A | 4/1992 |
| JP | H04341333 A | 11/1992 |
| JP | H06169079 A | 6/1994 |
| JP | H07-507000 A | 8/1995 |
| JP | 08-201978 | 9/1996 |
| JP | 2005233637 A | 9/2005 |
| JP | 2006-192398 A | 7/2006 |
| JP | 2008-201635 A | 9/2008 |
| JP | 2009-146576 A | 7/2009 |
| JP | 2009-295378 A | 12/2009 |
| KR | 1020000000662 | 1/2000 |
| RU | 2141377 C1 | 11/1999 |
| RU | 2176928 C2 | 12/2001 |
| RU | 2487145 C1 | 7/2013 |
| WO | WO-92/03217 A1 | 3/1992 |
| WO | WO-97/44121 A1 | 11/1997 |
| WO | WO-2010/068839 A2 | 6/2010 |
| WO | WO-2011/087913 A1 | 7/2011 |
| WO | WO-2012/102678 A1 | 8/2012 |
| WO | WO-2012/135679 A2 | 10/2012 |
| WO | WO-2012/149141 A1 | 11/2012 |
| WO | WO-2013/130143 A2 | 9/2013 |
| WO | WO-2013/155453 A1 | 10/2013 |
| WO | WO-2014/059339 A1 | 4/2014 |
| WO | WO-2014/186552 A1 | 11/2014 |
| WO | WO-2015/012869 A1 | 1/2015 |
| WO | WO-2015/157227 A1 | 10/2015 |

OTHER PUBLICATIONS

Cheng et al., "Film climbing of particle-laden interfaces," Colloids and Surfaces A: Physicochemical and Engineering Aspects, 315:275-284 (2008).

Dictionary.com, "Light Mineral Oil," p. 1-3 (2015).

Extended European Search Report dated Mar. 21, 2013, for European Patent Application No. 09832594.7.

Ferreira, et al., "Transport of metallic ions through polyaniline-containing composite membranes," J Chem Eng Data, 55: 4801-4807 (2010).

Guillen et al., "Pore-structure, hydrophilicity, and particle filtration characteristics of polyaniline-polysulfone ultrafiltration membranes," Journal of Materials Chemistry, 20:4621-4628 (2010).

Huang et al., "Novel chlorine resistant low-fouling ultrafiltration membrane based on a hydrophilic polyaniline derivative," Journals of Chemistry A (2015).

International Search Report dated Dec. 2, 2013, from PCT/US2013/052348.

International Search Report dated Feb. 20, 2014, from PCT/US13/64641.

International Search Report dated Jun. 30, 2015 from PCT/US2015/024635.

ISR dated Aug. 19, 2013 from WO13/155453.

ISR dated Jul. 13, 2010 from PCT/US2009/067628.

Japanese Office Action dated Dec. 2, 2014, from JP 2012-548961.

Langer, Jerzy J., "N-Substituted Polyanilines I. Poly(N-Methylaniline) and Related Copolymers," Synthetic Metals, 35:295-300 (1990).

Liao et al., "Highly dispersible polypyrrole nanospheres for advanced nanocomposite ultrafiltration membranes," Materials Horizons (2013).

(56) References Cited

OTHER PUBLICATIONS

Lindfors et al., "Potentiometric and UV—vis characterization of N-substituted polyanilines," Journal of Electroanalytical Chemistry, 535:65-74 (2002).

Manohar et al., "N-Substituted Derivatives of Polyaniline," Synthetic Metals, 29:E349-E356 (1989).

Massey, "Effects of UV Light and Weather on Plastics and Elastomers—Chapter 30.1: Polyethylene Terephthalate Weathering Properties," William Andrew Publishing, p. 167-172 (2007).

Matsunaga et al., "Surface changes brought about by corona discharge treatment of polyetheylene film and the effect on subsequent microbial colonisation," Polymer Degradation and Stability, 70:325-332 (2000).

McVerry et al., "Fabrication of Low-Fouling Ultrafiltration Membranes Using a Hydrophilic, Self-Doping Polyaniline Additive," Chemistry of Materials, 25:3597-3602 (2013).

Shadi et al., "Synthesis and Characterization of N- and O-Alkylated Poly[aniline-co-N-(2-hydroxyethyl) aniline]," Journal of Applied Polymer Science, 124:2118-2126 (2012).

Supplementary European Search Report for European Patent Application No. EP 14797886.0 dated Feb. 16, 2017.

Supplementary European Search Report issued by the European Patent Office, dated Apr. 13, 2016, in corresponding EP Application No. 13845639.

Tan et al., "Characterization and transport properties of Nafion/polyaniline composite membranes," The Journal of Physical Chemistry. B, 109(49):23480-23490 (2005).

Written Opinion for International Application No. PCT/US2009/067628 dated Jul. 13, 2010.

Xia, et al., "Camphorsulfonic acid fully doped polyaniline emeraldine salt: conformations in different solvents studied by an ultraviolet/visible/near-infrared spectroscopic method," Chem Mater, 7: 443-445 (1995).

Extended European Search Report issued by the European Patent Office in corresponding Application No. EP 15777181.7, dated Oct. 25, 2017.

Jaymand, "Recent progress in chemical modification of polyaniline," Prog Polym Sci, 38(9):1287-1306 (2013).

Sairam et al., "Nanoporous asymmetric polyaniline films for filtration of organic solvents," J Membrane Sci, 330(1-2):166-174 (2009).

Notice of Allowance and Fees Due for U.S. Appl. No. 14/434,266 dated Jul. 31, 2018.

Sedenkova et al., "Chemical degradation of polyaniline by reaction with Fenton's reagent—a spectroelectrochemical study," Chemical Papers, 67(8):961-971-2013).

Song et al., "Conducting Polyaniline Nanowire and Its Applications in Chemiresistive Sensing," Nanomaterials, 3:498-523 (2013).

Extended European Search Report for EP application No. EP18199109 dated May 20, 2019.

Huang et al., "Nanofiber Formation in the Chemical Polymerization of Aniline: A Mechanistic Study," Angew Chem. 43(43): 5817-5821 (2004).

\* cited by examiner

| PANi-152 | As-Cast | HCl-Treated |
|---|---|---|
| Structural Parameter, S (μm) | 288.7 | 126.9 |
| Porosity, $\varepsilon$ | 57.5 ± 4.9 | 56.4 ± 0.9 |
| 500X |  |  |

FIG. 13

| Conditions | CTA | | PANI | |
|---|---|---|---|---|
| | Water Permeability Ratio | Salt Passage Ratio | Water Permeability Ratio | Salt Passage Ratio |
| No Treatment | 1.00 | 1.00 | 1.12 | 2.01 |
| Wet Cure 35C, 2min | | | 1.13 | 1.16 |
| CSA 20g/L (pH~1.3), 1 hour | 0.81 | 0.68 | 1.00 | 1.80 |
| NaOH (pH = 12), 13 hours | 0.06 | 73.70 | 1.06 | 1.97 |

POLYANILINE MEMBRANES FORMED BY PHASE INVERSION FOR FORWARD OSMOSIS APPLICATIONS

RELATED APPLICATIONS

This application is the U.S. National Stage of PCT/US2014/038155, filed May 15, 2014, which claims the benefit of priority to U.S. Provisional Patent Application Ser. No. 61/823,739, filed May 15, 2013.

BACKGROUND

It is estimated that less than one percent of the world's entire water supply is accessible fresh water, which is becoming increasingly stressed. A process called low-energy desalination has been proposed to augment this depleting fresh water supply, without requiring a large amount of energy as by current desalination by reverse osmosis (RO). Low energy desalination by forward osmosis (FO) exploits the natural process of osmosis to draw fresh water from seawater into a very concentrated solution when separated by a semi-permeable membrane. The solute in the concentrated solution is recoverable by various means such as low grade heat, and shift in solution temperature or acidity. The major hindrance in the development of this process is the lack of suitable membranes.

There exists a need for chemically- and thermally-stable materials capable of purifying water via forward osmosis.

SUMMARY

In certain embodiments, the invention relates to a forward osmosis membrane, wherein the membrane consists essentially of a porous support material and a polymer layer; and the polymer layer comprises polyaniline.

In certain embodiments, the invention relates to a method of forming a membrane, comprising the steps of:
a. providing a first composition comprising polyaniline and a polyaniline solvent;
b. coating the first composition onto a porous support material; and
c. contacting the porous support material coated with the first composition with a polyaniline nonsolvent, thereby forming the membrane.

In certain embodiments, the invention relates to a method comprising passing a liquid composition through a membrane described herein, wherein the liquid composition comprises a solute and a solvent; and the membrane is substantially impermeable to the solute.

BRIEF DESCRIPTION OF THE FIGURES

FIG. 10A-1 depicts a SEM image of the cross-section of a membrane made using a 152 μm casting blade height. Scale bar=10 μm.

FIG. 10A-2 depicts a SEM image of the cross-section of a membrane made using a 102 μm casting blade height. Scale bar=10 μm.

FIG. 10B-1 depicts a SEM image of the cross-section of a membrane made using a 152 μm casting blade height. Scale bar=1 μm.

FIG. 10B-2 depicts a SEM image of the cross-section of a membrane made using a 102 μm casting blade height. Scale bar=1 μm.

FIG. 13 shows a comparison of properties of CTA and PANi membranes subjected to various post-casting treatments

DETAILED DESCRIPTION

Overview

Figure 1:
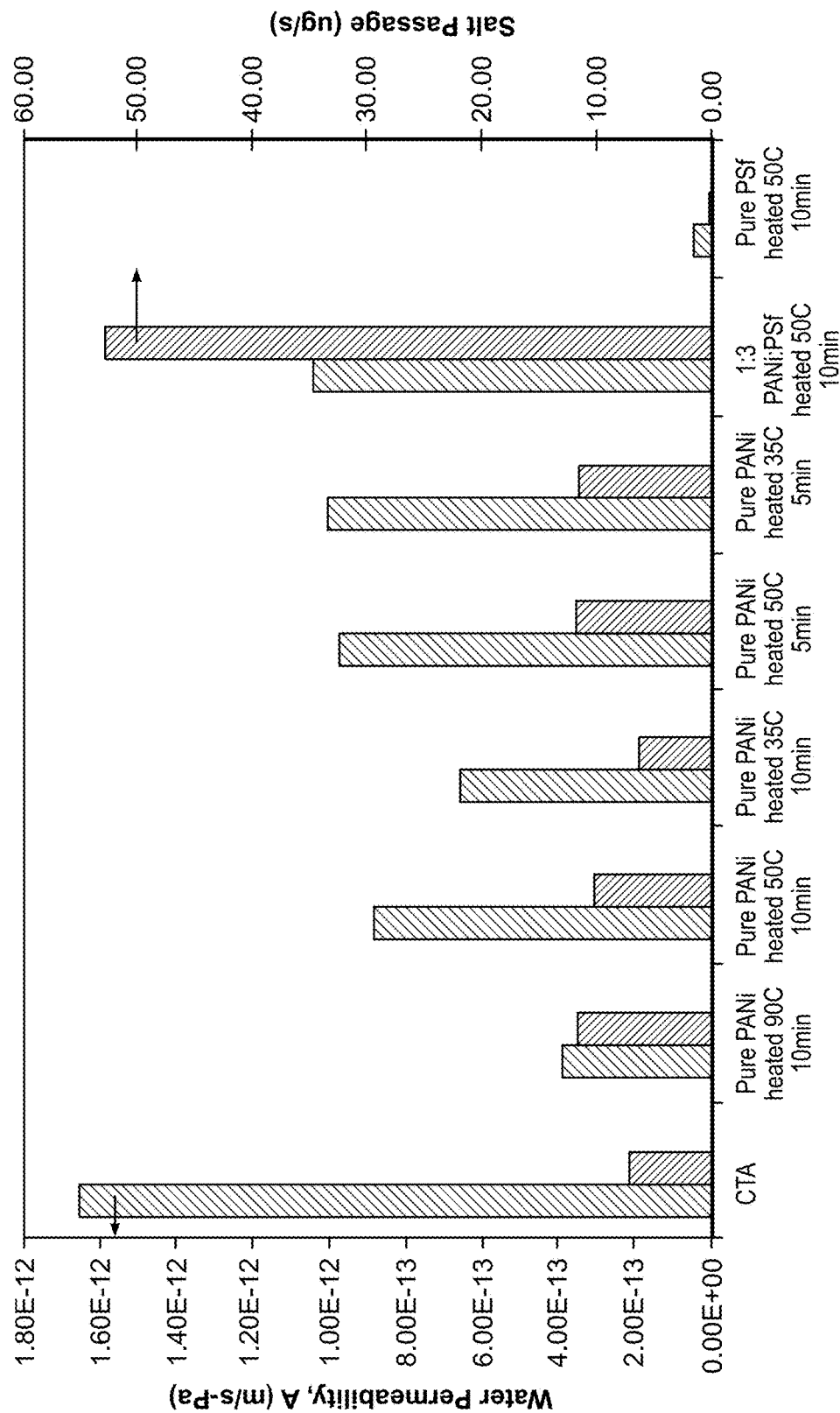
FIG. 1 depicts the water permeability (A), in m/S Pa (left bar), and salt passage, in μg/s (right bar), of various membranes without coatings. The experiments were run in FO mode (draw solution=32 g/L NaCl; feed solution=DI water; 20° C.; flowrates=0.1 gpm). The PANi used was 65 kDa PANi from Sigma-Aldrich.

In certain embodiments, the invention relates to the use of polyaniline (PANi), a super wettable material, to make a FO membrane that allows for high water permeability while maintaining high salt selectivity. In preferred embodiments, the polyaniline membranes are formed by nonsolvent induced phase separation or phase inversion. In this process, a polymer dissolved in a solvent is cast onto a fabric, and immersed in a nonsolvent. Upon immersion, the nonsolvent induces the polymer to precipitate to form the membrane.

In certain embodiments, the membranes of the invention display good wettability and tunable morphology. Due to their desirable characteristics, the membranes of the invention may be used in many FO applications in addition to desalination, including treatment of landfill leachate, production of emergency drinks, and concentration of nutrients from treated sewage.

Definitions

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "forward osmosis" (FO) signifies a process where the osmotic pressure differential across a semipermeable membrane is the driving force for transport of water through the membrane. The FO process results in concentration of a feed stream and dilution of a highly concentrated stream (referred to as the draw solution).

"Insoluble" refers to a poorly solubilized solid in a specified liquid (i.e., a "nonsolvent") such that when the solid and liquid are combined a heterogeneous mixture results. It is recognized that the solubility of an "insoluble" solid in a specified liquid might not be zero but rather it would be smaller than that which is useful in practice. The use of the terms "soluble", "insoluble", "solubility" and the like are not intended to imply that only a solid/liquid mixture is intended. For example, a statement that the additive is soluble in water is not meant to imply that the additive must be a solid; the possibility that the additive may be a liquid is not excluded.

As used herein, the term "molecular weight" (MW) refers to the mass of one molecule of that substance, relative to the unified atomic mass unit u (equal to 1/12 the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w, on average. The weight average molecular weight can be determined by light scattering, small angle neutron scattering (SANS), X-ray scattering, and sedimentation velocity.

As used herein, the terms "polydispersity" and "polydispersity index" refer to the ratio of the weight average to the number average ($M_w/M_n$).

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "salt" refers to an ionic compound that is not a zwitterion. This may include sodium chloride (traditional table salt), other inorganic salts, or salts in which the anion(s), the cation(s), or both are organic. The term "salty" means comprising at least one salt.

"Supported" means a material is assembled on a second material such that the second materials imparts mechanical stability to the first material without eliminating all of its functions.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Exemplary Membranes

In a first aspect, the invention relates to a polyaniline-containing forward osmosis membrane. In certain embodiments, the polyaniline membrane is made by phase inversion. In certain embodiments, the invention relates to any one of the membranes described herein, wherein the membrane comprises a porous support material and a polymer layer; and the polymer layer comprises polyaniline.

In certain such embodiments, the invention relates to any one of the membranes described herein, wherein the membrane consists essentially of a porous support material and a polymer layer; and the polymer layer consists essentially of polyaniline. In particular such embodiments, the membranes consist of only these two layers.

In certain embodiments, the invention relates to any one of the membranes described herein, wherein the polymer layer comprises leucoemeraldine polyaniline, emeraldine polyaniline, or pernigraniline polyaniline. In certain such embodiments, the invention relates to any one of the membranes described herein, wherein the polymer layer is leucoemeraldine polyaniline, emeraldine polyaniline, or pernigraniline polyaniline.

In certain embodiments, the invention relates to any one of the membranes described herein, wherein the polyaniline has a molecular weight from about 30 kDa to about 100 kDa. In certain such embodiments, the molecular weight of the polyaniline is about 40 kDa, about 45 kDa, about 50 kDa, about 55 kDa, about 60 kDa, about 65 kDa, about 70 kDa, about 75 kDa, about 80 kDa, about 85 kDa, or about 90 kDa, preferably about 65 kDa.

In certain embodiments, the invention relates to any one of the membranes described herein, wherein the polymer layer further comprises a dopant. The dopant may be an acid or a base, such as camphor sulfonic acid, hydrochloric acid, or sodium hydroxide.

In certain embodiments, the invention relates to any one of the membranes described herein, wherein the thickness of the polymer layer is from about 20 µm to about 120 µm. In certain such embodiments, the thickness of the polymer layer is about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm. One way to estimate the thickness of the polymer layer is by SEM.

In certain embodiments, the invention relates to any one of the membranes described herein, wherein the porous support material is a fabric, such as a non-woven fabric, e.g., a non-woven polyester fabric.

The permeability of the membranes can be expressed in terms of the pure water permeability. The permeability of the disclosed membranes can be measured, for example, using a dead-end stirred cell (Sterlitech).

In certain embodiments, the invention relates to any one of the membranes described herein, wherein the water permeability of the membrane is greater than about $1.5\times 10^{-12}$ m/s·Pa, preferably greater than about $2.0\times 10^{-12}$ m/s·Pa.

The salt rejection of the membranes can be expressed in terms of salt (NaCl) passage. The salt passage of the disclosed membranes can be measured, for example, using a dead-end stirred cell (Sterlitech).

In certain embodiments, the invention relates to any one of the membranes described herein, wherein the salt passage of the membrane is less than about 16 µg/s, less than about 14 µg/s, preferably less than about 12 µg/s, ever more preferably less than about 10 µg/s.

In various embodiments, a membrane of the invention can have a pure water equilibrium contact angle of less than about 90°. In certain such embodiments, a membrane of the invention can have a pure water equilibrium contact angle of less than about 80°. In still further embodiments, a membrane of the invention can have a pure water equilibrium contact angle of less than about 70°. In yet further embodiments, a membrane of the invention can have a pure water equilibrium contact angle of less than about 60°. In even further embodiments, a membrane of the invention can have a pure water equilibrium contact angle of less than about 50°. In still further embodiments, a membrane of the invention can have a pure water equilibrium contact angle of less than about 40°. In yet further embodiments, a membrane of the invention can have a pure water equilibrium contact angle of less than about 30°. In certain particular embodiments, a membrane of the invention can have a pure water equilibrium contact angle of about 20°, about 30°, about 31°, about 32°, about 33°, about 34°, about 35°, about 36°, about 37°, about 380, about 39°, or about 40°. Membrane surface contact angle measurements may be carried out, for example, with a KRUSS DSA 10 goniometer using the captive bubble method.

Compared to the commercially-available CTA FO membrane, the PANi membrane has higher chemical and thermal stability.

In certain embodiments, the invention relates to any one of the membranes described herein, wherein the water permeability of the membrane does not change significantly after being immersed in a solution at pH=12 for 13 h.

In certain embodiments, the invention relates to any one of the membranes described herein, wherein the salt selectivity of the membrane does not change significantly after being immersed in a solution at pH=12 for 13 h.

Exemplary Methods of Making

In certain embodiments, the invention relates to any one of the membranes described herein, formed by a process called nonsolvent induced phase separation or phase inversion, which forms a membrane with skin layer pores and sublayer macrovoids.

In another aspect, the invention relates to a method of forming a membrane, comprising the steps of:

a. providing a first composition comprising polyaniline and a polyaniline solvent;

b. coating the first composition onto a porous support material; and c. contacting the porous support material coated with the first composition with a polyaniline nonsolvent, thereby forming the membrane.

In certain embodiments, the method is a method of forming a membrane described herein.

In certain embodiments, the invention relates to any one of the methods described herein, wherein the polyaniline solvent is selected from N-methyl-2-pyrrolidone and 4-methylpiperidine, and mixtures thereof. In certain embodiments, the polyaniline solvent is a mixture of N-methyl-2-pyrrolidone and 4-methylpiperidine. In certain such embodiments, the weight ratio of N-methyl-2-pyrrolidone to 4-methylpiperidine is from about 8:1 to about 16:1. In certain particular embodiments, the weight ratio of N-methyl-2-pyrrolidone to 4-methylpiperidine is about 8:1, about 9:1, about 10:1, about 11:1, about 12:1, about 13:1, about 14:1, about 15:1, or about 16:1, preferably about 12.5:1.

In certain embodiments, the invention relates to any one of the methods described herein, wherein the concentration of polyaniline in the polyaniline solvent is from about 6 wt % to about 18 wt %. In certain such embodiments, the invention relates to any one of the methods described herein, wherein the concentration of polyaniline in the polyaniline solvent is about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, or about 18 wt %, preferably about 12 wt %.

In certain embodiments, the invention relates to any one of the methods described herein, wherein the polyaniline is leucoemeraldine polyaniline, emeraldine polyaniline, or pernigraniline polyaniline.

In certain embodiments, the invention relates to any one of the methods described herein, wherein the polyaniline has a molecular weight from about 30 kDa to about 100 kDa. In certain such embodiments, the molecular weight of the polyaniline is about 40 kDa, about 45 kDa, about 50 kDa, about 55 kDa, about 60 kDa, about 65 kDa, about 70 kDa, about 75 kDa, about 80 kDa, about 85 kDa, or about 90 kDa, preferably about 65 kDa.

In certain embodiments, the invention relates to any one of the methods described herein, wherein the porous support material is a fabric, such as a non-woven fabric, e.g., a non-woven polyester fabric.

In certain embodiments, the invention relates to any one of the methods described herein, further comprising distributing the first composition substantially uniformly on the porous support material. Preferably, a casting blade set to a desired blade height is used to spread the first composition substantially uniformly across the porous support material.

In certain embodiments, the invention relates to any one of the methods described herein, wherein the polyaniline nonsolvent is water. In certain such embodiment, the polyaniline nonsolvent is water at about 15° C., about 16° C., about 17° C., about 18° C., about 19° C., about 20° C., about 21° C., about 22° C., about 23° C., about 24° C., about 25° C., about 26° C., about 27° C., or about 28° C. Preferably, the polyaniline nonsolvent is water at about 23° C.

In certain embodiments, the method comprises immersing the porous support material coated with the first composition in the polyaniline nonsolvent.

In certain embodiment, the method comprises contacting the porous support material coated with the first composition with, or even immersing it in, the polyaniline nonsolvent for a third period of time. In certain such embodiments, the third period of time is from about 15 min to about 1 h, such as about 15 min, about 30 min, about 45 min, or about 1 h, preferably about 30 min.

In certain embodiments, the invention relates to any one of the methods described herein, wherein the method further comprises wet-curing the membrane. Preferably, wet-curing the membrane involves contacting the membrane with water at a first temperature for a first period of time. In certain such embodiments, the first period of time is from about 1 min to about 10 min, such as about 1 min, about 2 min, about 3 min, or about 4 min, preferably about 2 min. In certain such embodiments, the first temperature is from about 35° C. to about 100° C., such as about 35° C., about 50° C., about 75° C., or about 100° C., preferably about 50° C.

In certain embodiments, the invention relates to any one of the methods described herein, wherein the method further comprises post-treating the membrane. In certain such embodiments, the method further comprises contacting the membrane with a chemical, such as a dopant, for a second period of time. In certain such embodiments, is an acid or a base, such as camphor sulfonic acid, hydrochloric acid, or sodium hydroxide. In certain such embodiments, the second period of time is from about 30 min to about 20 h, such as about 1 h or about 2 h, preferably about 1 h. In certain such embodiments, the membrane is contacted with the chemical (e.g., dopant) in a solution. In certain embodiments, the pH of the solution is from about 1 to about 14, such as about 1, about 2, about 3, about 4, about 5, about 6, about 7, about 8, about 9, about 10, about 11, about 12, about 13, or about 14, preferably about 1 or about 3.

Exemplary Methods of Using

In another aspect, the invention relates to a method comprising passing a liquid composition through any one of the membranes disclosed herein, wherein the liquid composition comprises a solute and a solvent; and the membrane is substantially impermeable to the solute.

In certain embodiments, the invention relates to any one of the methods described herein, wherein the liquid composition is suitable for forward osmosis applications.

In certain embodiments, the invention relates to any one of the methods described herein, wherein the liquid composition is salt water. In certain embodiments, the invention relates to any one of the methods described herein, wherein the liquid composition is brackish water.

In certain embodiments, the invention relates to any one of the methods described herein, wherein the solute is a pathogen or a toxin.

In certain embodiments, the invention relates to any one of the methods described herein, wherein the method is used in various forward osmosis applications, including concentration of nutrients in treated sewage, concentration of RO brine, and treatment of landfill leachate.

In certain aspects, the invention relates to any one of the methods described herein, wherein the method is a method of producing desalinated water. In this low-energy desalination process, the membrane can be used to draw water from seawater into a concentrated draw solution, and the draw solute recovered by various means including by low grade heat (e.g., ammonium bicarbonate solution). The process has the feature of inherently low fouling because of the forward osmosis first step, unlike conventional reverse osmosis desalination plants where fouling is often a problem.

Another example of an application of this type may be found in "emergency drinks," or "hydration bags," which use an ingestible draw solute and are intended for separation of water from dilute feeds. This allows, for example, the ingestion of water from surface waters (streams, ponds, puddles, etc.) that may be expected to contain pathogens or toxins that are readily rejected by the FO membrane. With sufficient contact time, such water will permeate the membrane bag into the draw solution, leaving the undesirable feed constituents behind. The diluted draw solution may then be ingested directly. Typically, the draw solutes are sugars such as glucose or fructose, which provide the additional benefit of nutrition to the user of the FO device. A point of additional interest with such bags is that they may be readily used to recycle urine, greatly extending the ability of a backpacker or soldier to survive in arid environments. This process may also, in principle, be employed with highly concentrated saline feedwater sources such as seawater, as one of the first intended uses of FO with ingestible solutes was for survival in life rafts at sea.

In certain aspects, the method is a method of the treatment of landfill leachate. For example, the method is used to draw water from the leachate feed (i.e., liquid composition) into a saline (NaCl) brine. The diluted brine is then passed through a RO process to produce fresh water and a reusable brine concentrate.

In certain embodiments, the method is a method of the concentration of food products, such as fruit juice.

EXEMPLIFICATION

The invention now being generally described, it will be more readily understood by reference to the following examples, which are included merely for purposes of illustration of certain aspects and embodiments of the invention, and are not intended to limit the invention.

Example 1—Formation of Polyaniline FO Membrane by Nonsolvent Induced Phase Separation 1. 12 wt % polyaniline (65 kDa, Santa Fe Science and Technologies, Santa Fe, Calif.) is dissolved in 81.5 wt % N-methyl-2-pyrrolidone (Sigma-Aldrich, St-Louis, Mo.) and 6.5 wt % 4-methylpiperidine (Sigma-Aldrich) and stirred for at least 2 days prior to casting.
2. Polyester fabric is taped onto a glass plate with electrical tape to ensure the fabric lays flat.
3. A casting blade set to a desired blade height is used to spread the polymer solution uniformly across the fabric.
4. The glass plate is immediately immersed into a room temperature water bath, which causes the polymer to precipitate onto the fabric.
5. The membrane is left in the coagulation bath for 30 minutes before being transferred into plastic bags filled with Milli-Q water and stored in 4° C. until testing.

Example 2—FO Experiments

General Method

The membranes were tested in FO experiments which were conducted using a custom designed flow cell made of polycarbonate with transparent acrylic windows on both sides for viewing. The flow channels on both sides of the membrane are 2.54-cm wide, 7.62-cm long, and 1-mm high. The draw solution was set to flow co-currently with the feed solution, controlled independently by gear pumps (Micro-Pump A, Cole Parmer, Barrington, Ill.), and measured by rotameters (Blue White Industries Ltd, Huntington Beach, Calif.). The draw solution was placed on a balance (PI-2002, Denver Instruments, Bohemia, N.Y.) to record its mass every 30 seconds to a computer, from which the water flux was calculated. The conductivity of the feed solution was continuously monitored and recorded during the experiment with a calibrated conductivity probe (Cell constant: 10 cm$^{-1}$, Accumet XL50, Fisher Scientific, Hampton, N.H.) immersed in the feed solution. Both the water flux and salt flux reached steady-state approximately 5 minutes into the experiments. The initial volume of both draw and feed solutions was one liter, and the experiment length of 30 minutes, less than 30 mL of water permeated through the membrane to the draw and less than 1 g of salt passed into the feed for all experiments conducted. Thus, within the duration of the experiment, dilution of the draw and concentration of the feed was safely assumed to be negligible.

Characterization of Phase-Inverted PANi Membranes

TABLE 1

| Parameter | Conditions | Value |
|---|---|---|
| Water Permeability, A (m/s-Pa) | Dead-end filtration, 1-400 psi, calculated slope of pure water flux vs. pressure for linear portion (up to 20 psi), for 2 different pieces of membrane casted on 2 different days | $(3.04 \pm 0.43) \times 10^9$ |
| (gfd/psi) | | $44.44 \pm 6.20$ |
| Water Permeability after compaction | After compaction at 20 psi | $1.08 \times 10^9$ (m/s-Pa) 15.72 (gfd/psi) |
| Water Contact Angle | Captive bubble | $38.75 \pm 2.96$ |
| BSA Rejection (%) | Dead-end filtration, compacted at 20 psi, Feed: 50 mmol/L NaCl, 1 g/L BSA | 95.29 |
| NaCl Rejection (%) | Dead-end filtration, 5 mmol/L NaCl, Conductivity measured at 5, 10, 15, 20 psi Rejection (%): 0.968, 2.00, 2.18, 1.73 | 1.73 (20 psi) |

Effect of Heating Membranes without Coatings

Figure 2:
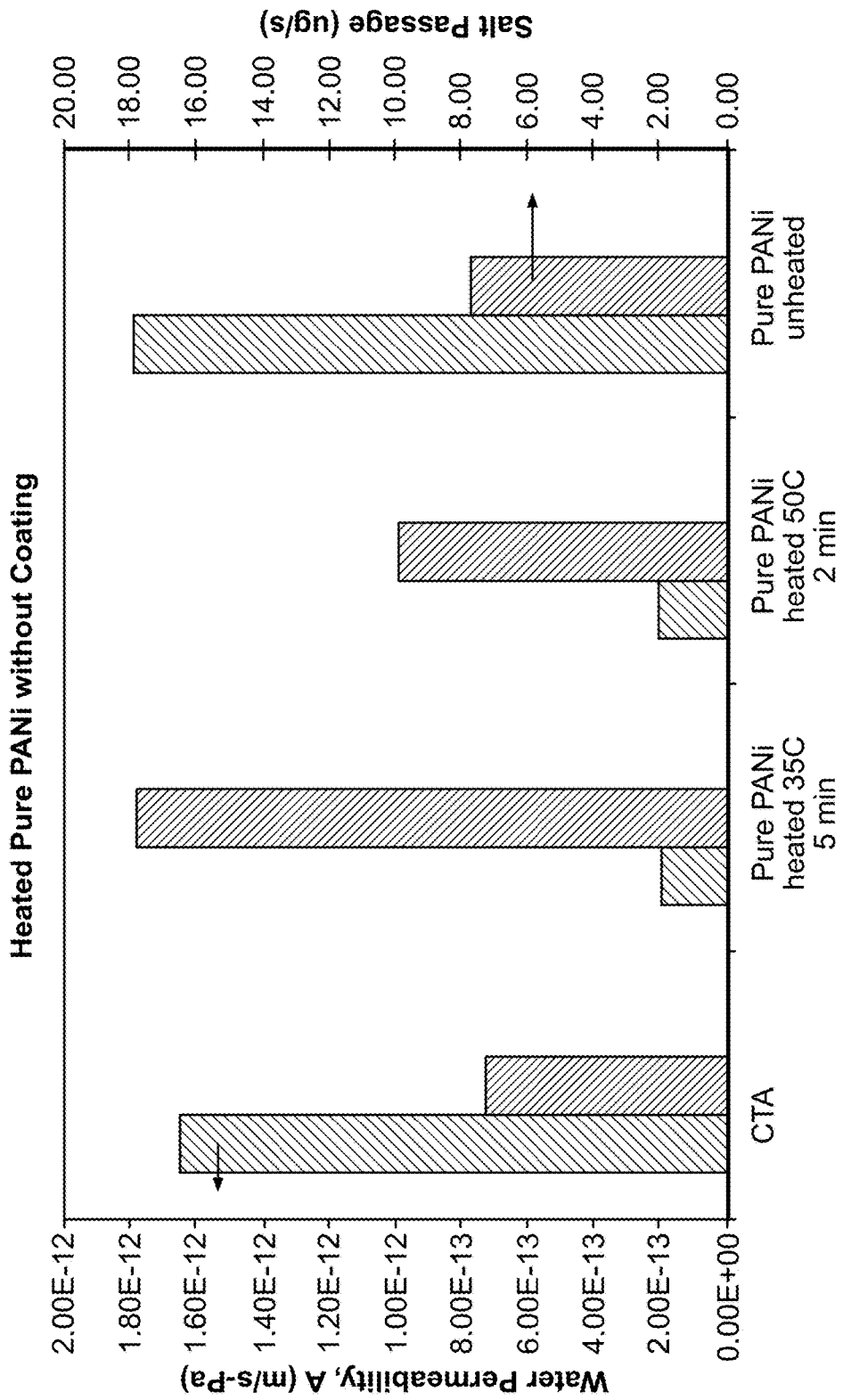
FIG. 2 depicts the water permeability (A), in m/S Pa (left bar), and salt passage, in μg/s (right bar), of various membranes without coatings. The experiments were run in FO mode (draw solution=32 g/L NaCl; feed solution=DI water; 20° C.; flowrates=0.1 gpm). The PANi used was 65 kDa PANi from Santa Fe Science and Technologies.

PANi, CTA, PANi-PSf, and PSf membranes were made and then heated at a specified temperature for a specified amount of time. The membranes were then tested as FO membranes (draw solution=32 g/L NaCl; feed solution=DI water; 20° C.; flowrates=0.1 gpm). See FIG. 1 and FIG. 2.

Effect of Post-Casting Treatments on Membranes

Figure 3:
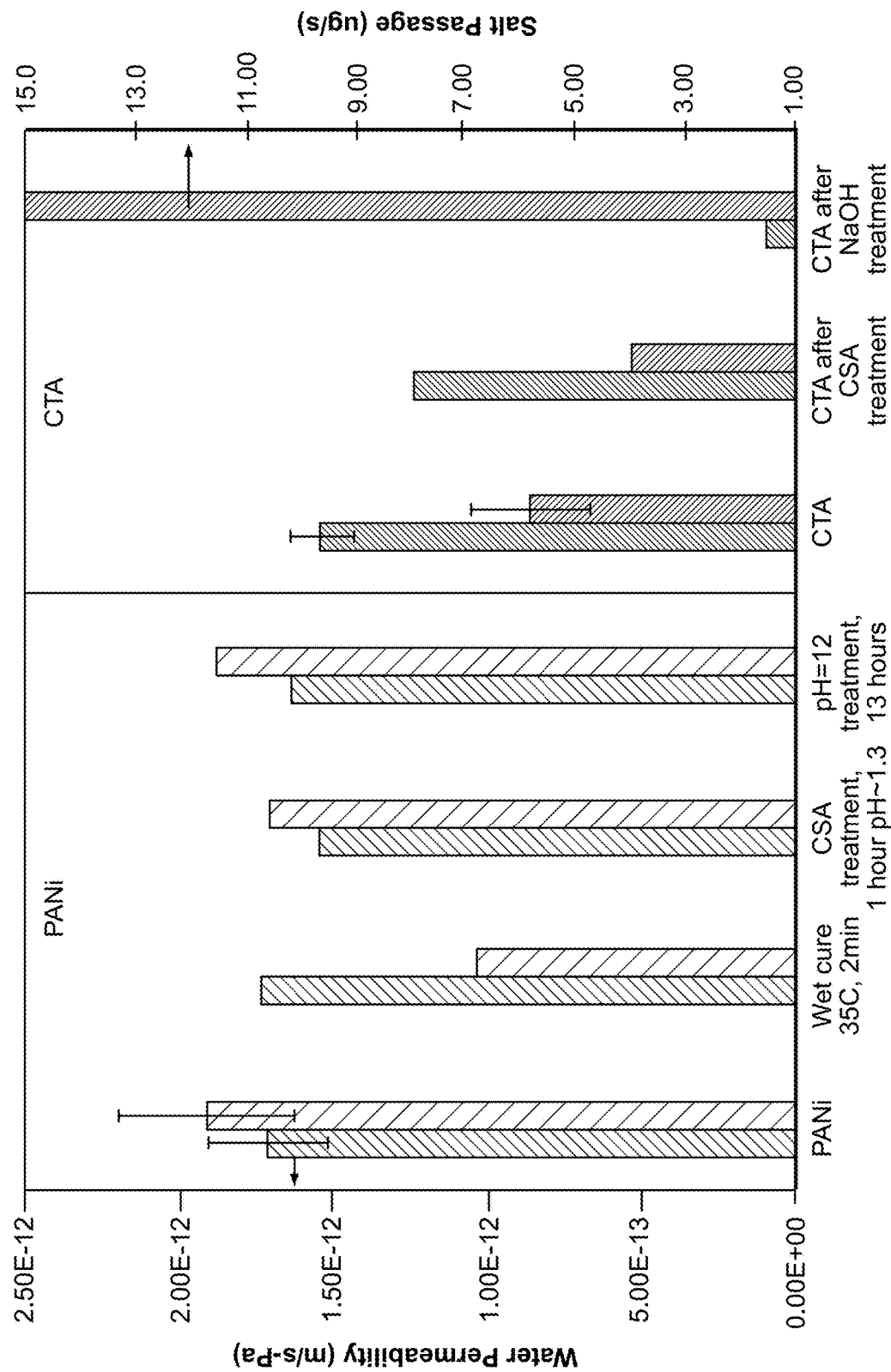
FIG. 3 depicts the water permeability (A), in m/S Pa (left bar), and salt passage, in μg/s (right bar), of various membranes with or without post-treatment. The experiments were run in FO mode (draw solution=32 g/L NaCl; feed solution=DI water; 20° C.; flowrates=0.1 gpm). Post-treatments: wet cure=water bath at 35° C. for 2 min; camphorsulfonic acid (CSA) treatment=20 g/L CSA, pH~1.3, 1 h; NaOH treatment=pH 12, 13 h.

PANi and CTA membranes were subjected to various post-treatments and then tested as FO membranes. The experiments were run in FO mode (draw solution=32 g/L NaCl; feed solution=DI water; 20° C.; flowrates=0.1 gpm). Post-treatments: wet cure=water bath at 35° C. for 2 min; CSA treatment=20 g/L CSA, pH~1.3, 1 h; NaOH treatment=pH 12, 13 h. Desired ratios: water permeability ratio $(A/A_{CTA})>1$; salt passage ratio $(P_s/P_{sCTA})<1$. See FIGS. 3 and 13.

PANi membranes with two different casting blade heights (152 μm and 102 μm) were made (12 wt % PANi (65 kDa from SFST) in NMP with 4-MP; coagulation bath=room temperature water; fabric substrate=from NanoH$_2$O). These membranes and CTA membranes were subjected to various post-treatments.

In one experiment, membranes were subject to wet-curing for 2 min at various temperatures. As exhibited in FIG. 4, the phase-inverted membrane cast at 152 μm becomes more permeable and more selective than the membrane casted at 102 μm during wet-curing at high temperatures. This may be because the heat is annealing the skin layer pores of the thicker membrane while starting to anneal the skin and sub-surface pores of the thinner membrane, decreasing both water and salt permeability. The higher temperatures for the 152 μm membrane don't seem to increase the permeability or selectivity much more, so it might become impractical to try higher temperatures. The important fact to note is that the CTA membrane does not have the thermal stability of the PANi membrane, as higher wet cure temperatures decrease permeability significantly.

Figure 5:
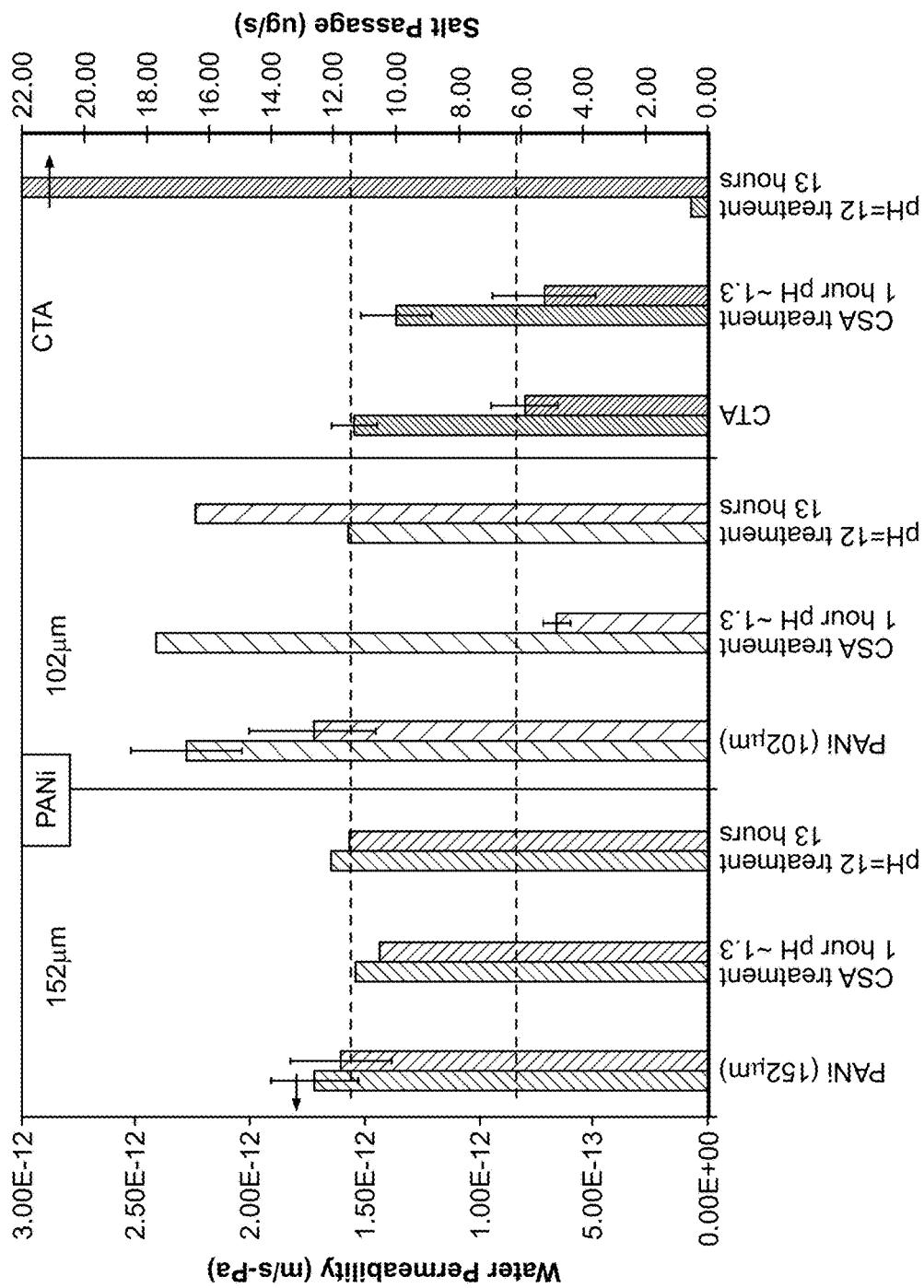
FIG. 5 depicts the water permeability (A), in m/S Pa (left bar), and salt passage, in gig/s (right bar), of various membranes with or without post-treatment. The experiments were run in FO mode (draw solution=32 g/L NaCl; feed solution=DI water; 20° C.; flowrates=0.1 gpm). Post-treatments: CSA treatment=100 mM CSA, pH~1.3, 1 h; NaOH treatment=pH 12, 13 h.

In another experiment, membranes were subject to CSA or NaOH treatment. As exhibited in FIG. 5, the PANi membrane casted at 102 μm post-treated with 100 mM for 1 hour performs significantly better than the CTA membrane in terms of water permeability and NaCl selectivity. Interestingly, this effect is not observed for the membrane casted at 152 μm, which may indicate that the CSA is having an effect on the sub-skin layer pores rather than the skin layer pores. Note: Performance of membrane after 100 mM CSA treatment for 1 hour, followed by a 3-hour soak in a beaker of DI water was A=2.37×10$^{-12}$ m/s-Pa and Salt Passage=4.77 μg/s. This indicates that the CSA treatment is not easily leached out with water. Furthermore, a decrease in performance during the duration of the experiment was not observed, which indicates that the CSA treatment to the membrane is not reversible with 32 g/L NaCl solution cross-flow.

Water contact angle measurements indicate that CSA post-treatment does not significantly affect the hydrophilicity of PANi membranes. See Table 3.

TABLE 3

Water contact angle (captive bubble) of various membranes

| Membrane | Post-Treatment | Water contact angle |
|---|---|---|
| CTA | None | $53.67 \pm 7.06$ |
| | 0.1M CSA, 1 h | $48.94 \pm 3.44$ |
| | 0.1M HCl, 1 h | $40.98 \pm 1.63$ |
| PANi-102 | None | $38.75 \pm 2.96$ |
| | 0.1M CSA, 1 h | $41.82 \pm 2.42$ |
| | 0.1M HCl, 1 h | $42.15 \pm 2.07$ |
| PANi-152 | None | $36.94 \pm 6.25$ |
| | 0.1M CSA, 1 h | $33.69 \pm 0.71$ |
| | 0.1M HCl 1 h | $49.81 \pm 5.39$ |

Figure 6:
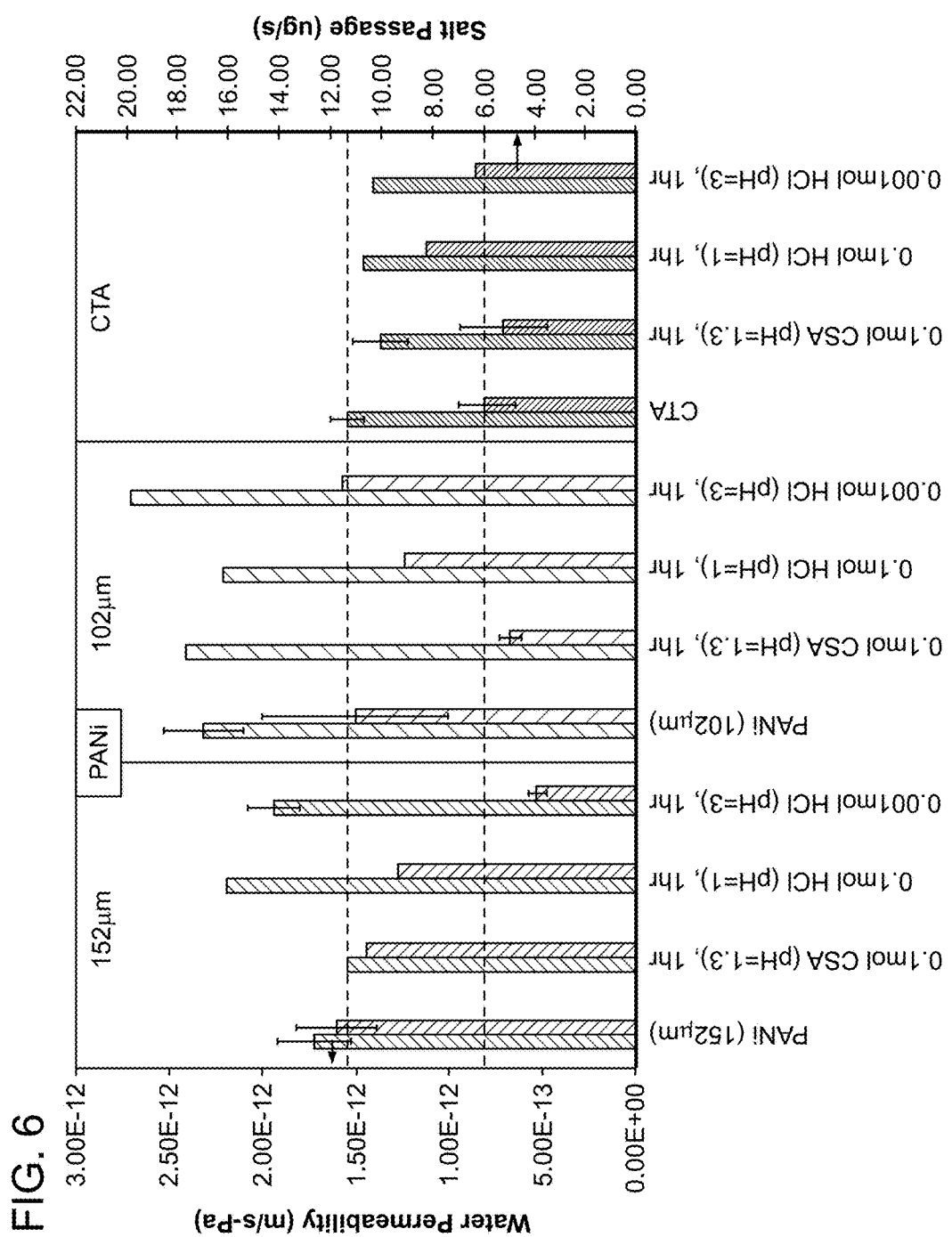
FIG. 6 depicts the water permeability (A), in m/S Pa (left bar), and salt passage, in μg/s (right bar), of various membranes with or without post-treatment, made with different casting blade heights. The experiments were run in FO mode (draw solution=32 g/L NaCl; feed solution=DI water; 20° C.; flowrates=0.1 gpm). Post-treatments: CSA treatment=100 mM CSA, pH~1.3, 1 h; HCl treatment=$10^{-3}$ mM HCl, pH~3, 1 h; HCl treatment=100 mM HCl, pH~1, 1 h.

Another experiment was undertaken to determine whether CSA post-treatment was improving the membrane performance, or whether the change was attributable solely to the pH of the post-treatment. As showing in FIG. 6, the HCl at pH~1 does improve the performance of the membrane, but does not increase the NaCl selectivity as much as CSA does. Furthermore, the pH of the post-treatment does seem to increase the selectivity, but more experiments are needed.

Figure 12A:
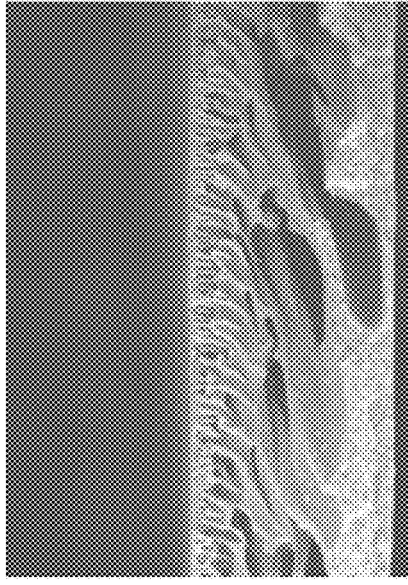
FIG. 12A tabulates the structural parameter, porosity, and SEM images at 500× magnification of a PANi membrane of the invention as cast (left), and after treatment with HCl (right).
Figure 12A:
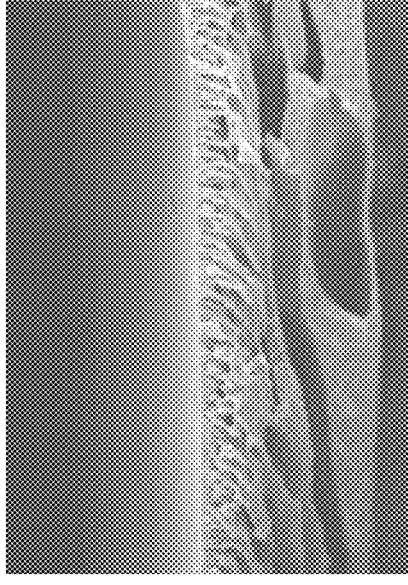
Figure 12B:
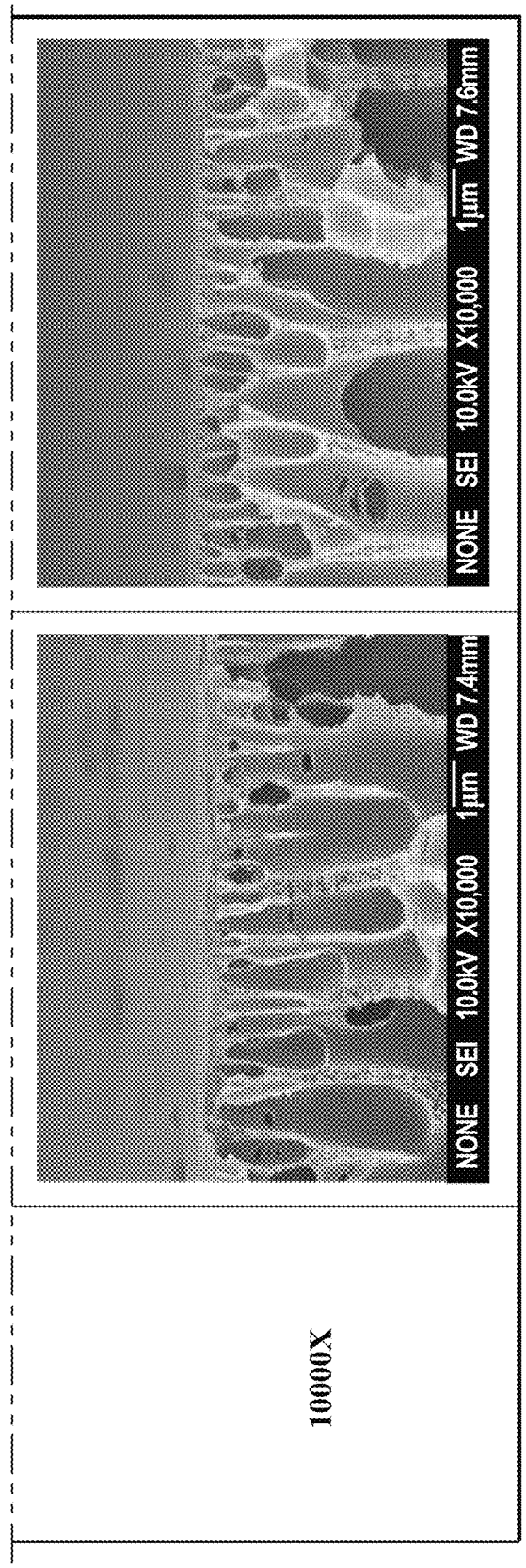
FIG. 12B tabulates SEM images at 10,000X of a PANi membrane of the invention as cast (left), and after treatment with HCl (right).

The effect of HCl treatment on a membrane of the invention is summarized in FIG. 12. Structure parameter changes were apparent; quantifiable changes in macrovoid morphology were not apparent.

Effect of Substrate on Membrane Performance

The effect of nature of the substrate on membrane performance was examined. The original fabric substrate is from NanoH$_2$O. A new fabric was tested—from Crane. To the naked eye, the Crane fabric appeared to be a non-woven fabric, with more void space than the NanoH$_2$O fabric.

Figure 7:
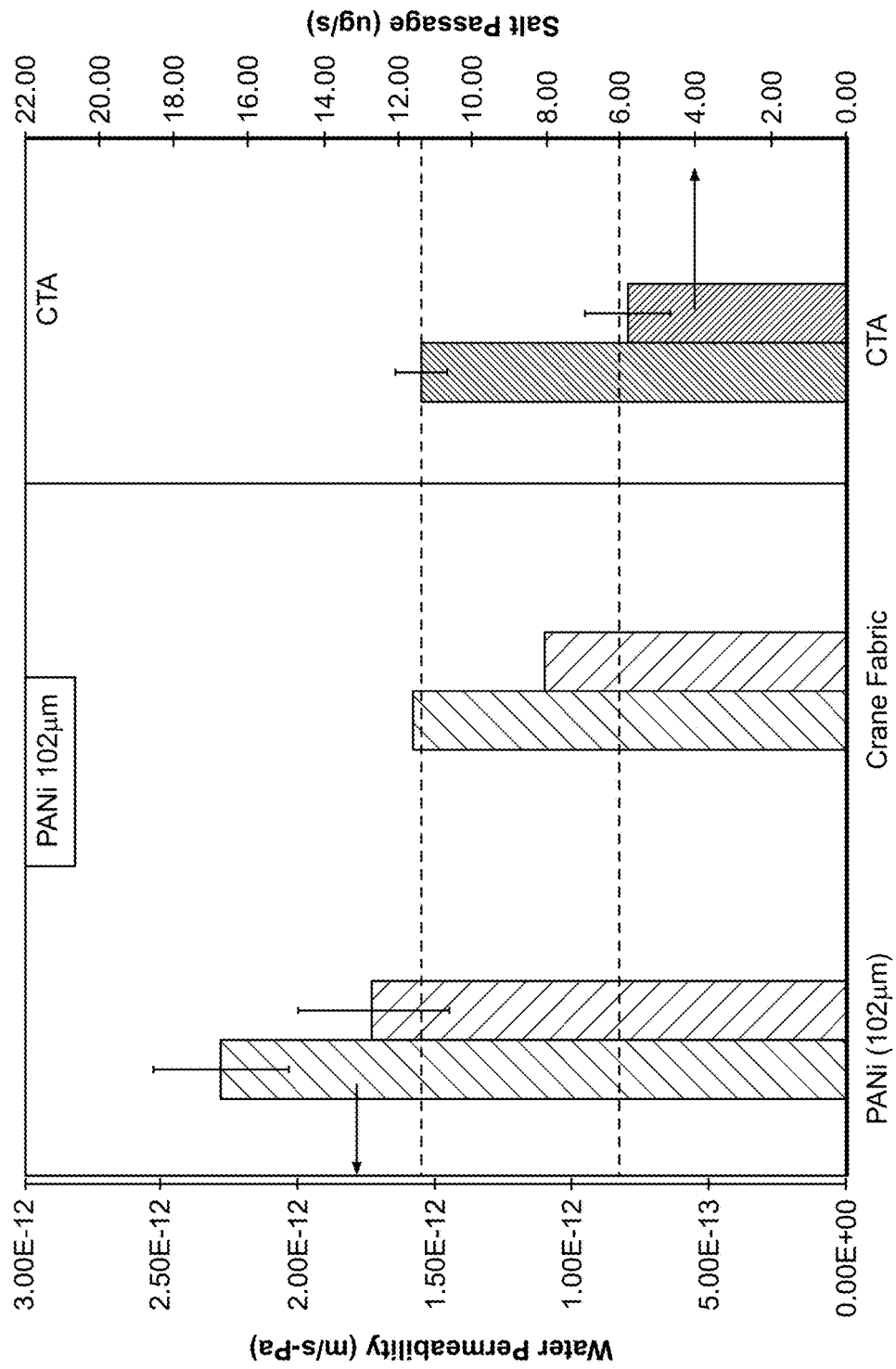
FIG. 7 depicts the water permeability (A), in m/S Pa (left bar), and salt passage, in μg/s (right bar), of various membranes made using different fabrics. The experiments were run in FO mode (draw solution=32 g/L NaCl; feed solution=DI water; 20° C.; flowrates=0.1 gpm).

As can be seen in FIG. 7, the identity of the fabric affects the membrane performance. The Crane fabric makes a much tighter membrane in terms of FO performance.

Effect of Casting Blade Height on Membrane Performance

Figure 8:
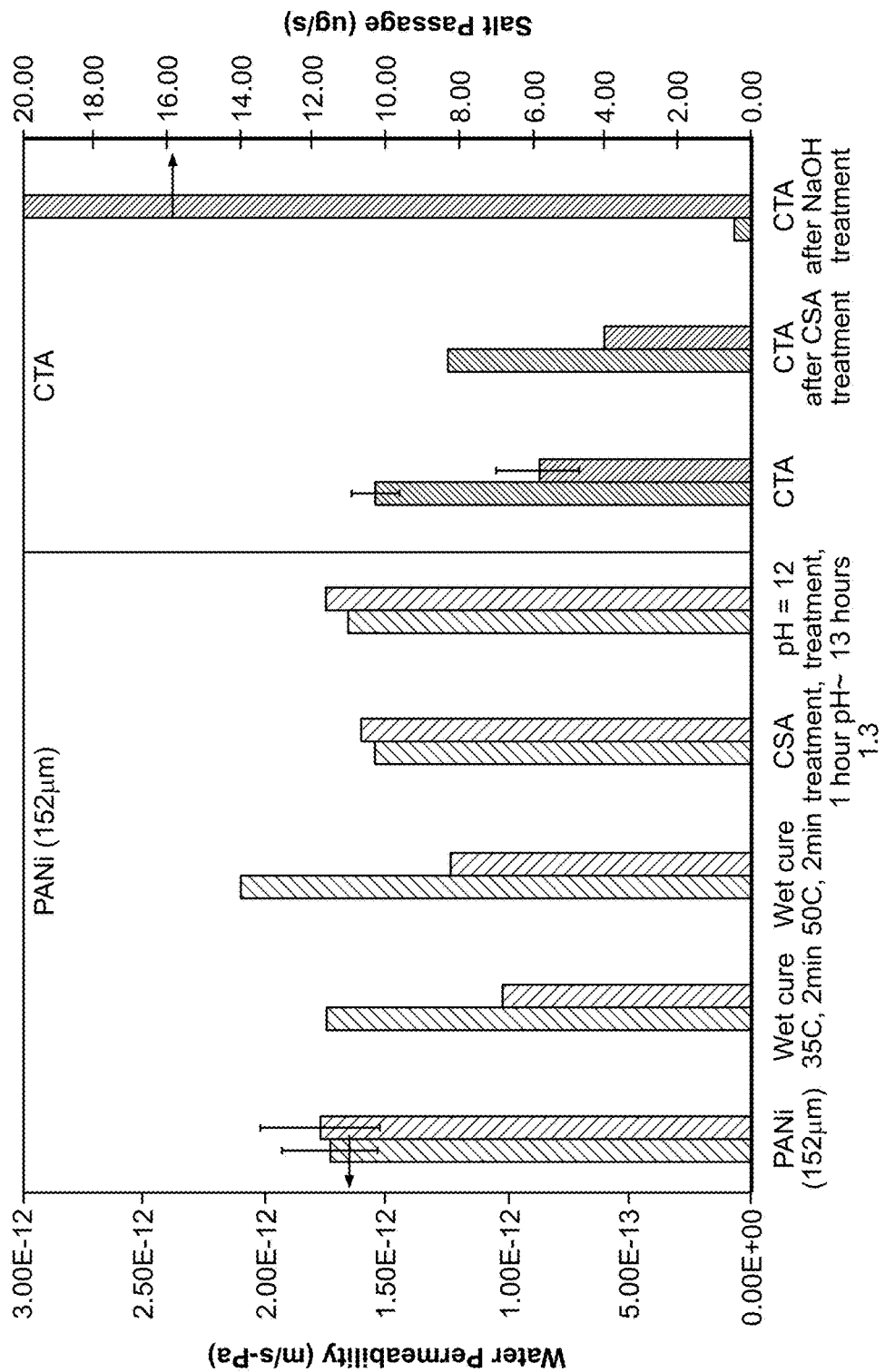
FIG. 8 depicts the water permeability (A), in m/S Pa (left bar), and salt passage, in jμg/s (right bar), of various membranes made using a different casting blade height. The experiments were run in FO mode (draw solution=32 g/L NaCl; feed solution=DI water; room temperature).
Figure 9:
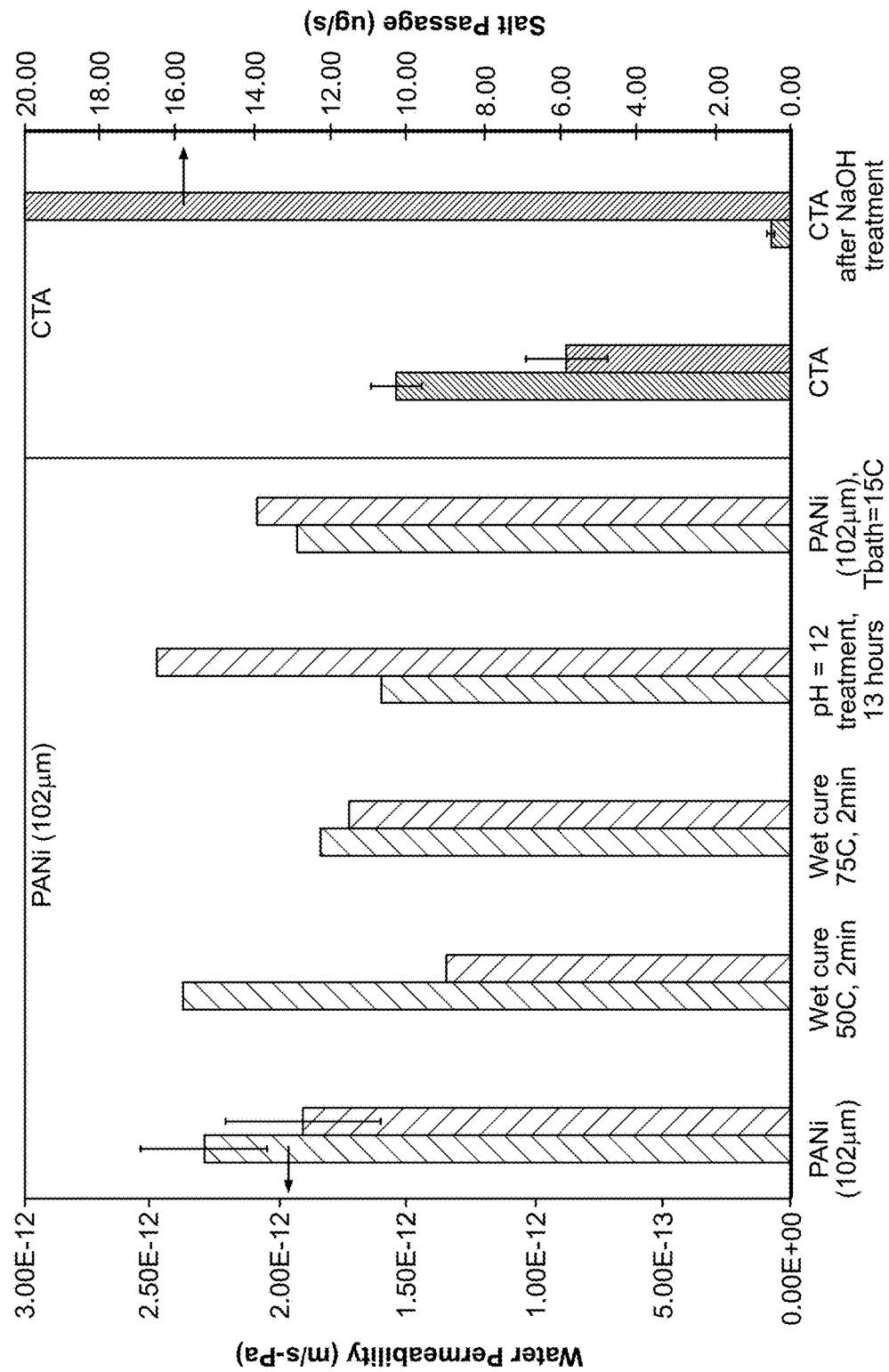
FIG. 9 depicts the water permeability (A), in m/S Pa (left bar), and salt passage, in μg/s (right bar), of various membranes made using a different casting blade height. The experiments were run in FO mode (draw solution=32 g/L NaCl; feed solution=DI water; room temperature).
Figures 1, 10A:
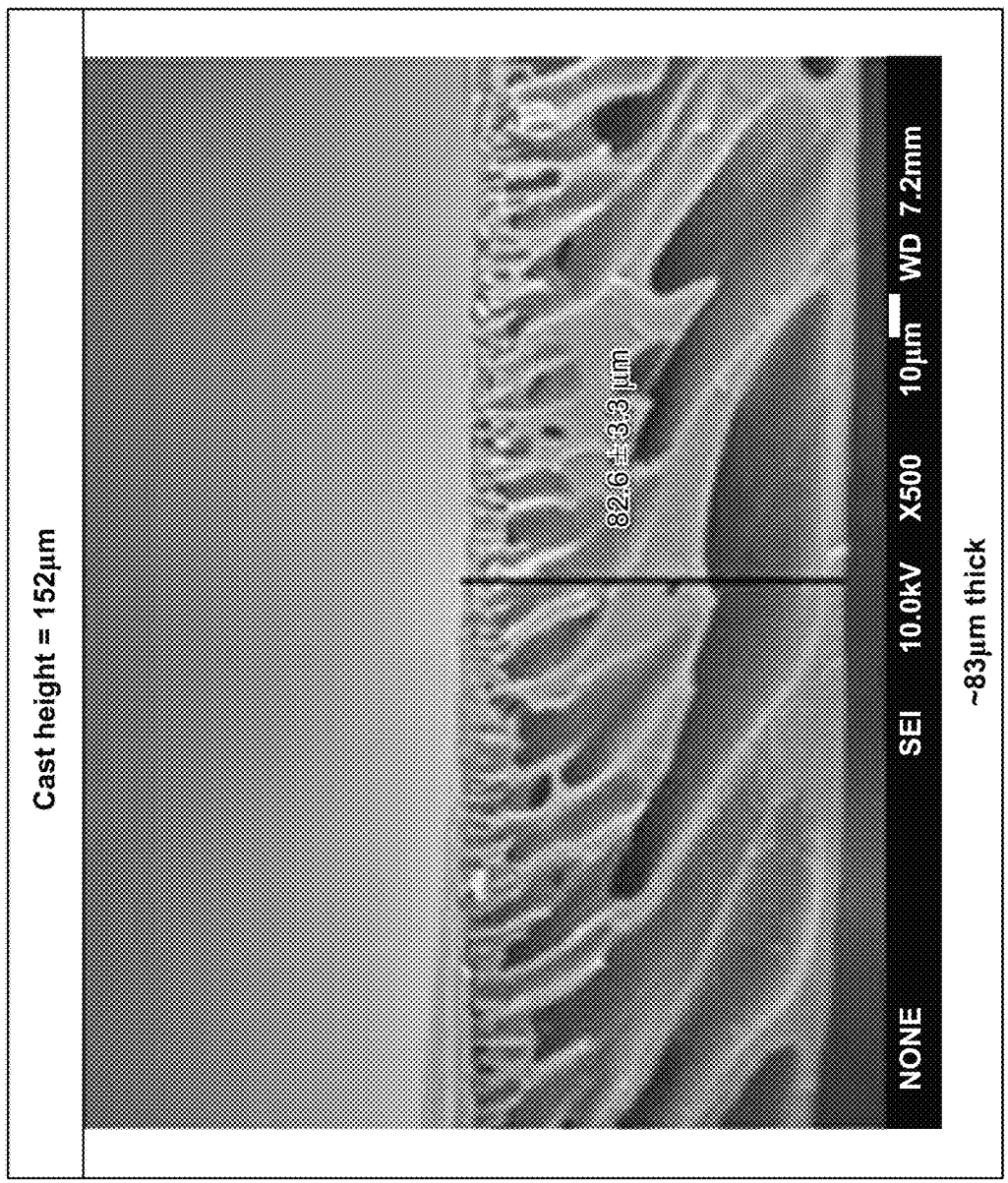
Figures 2, 10A:
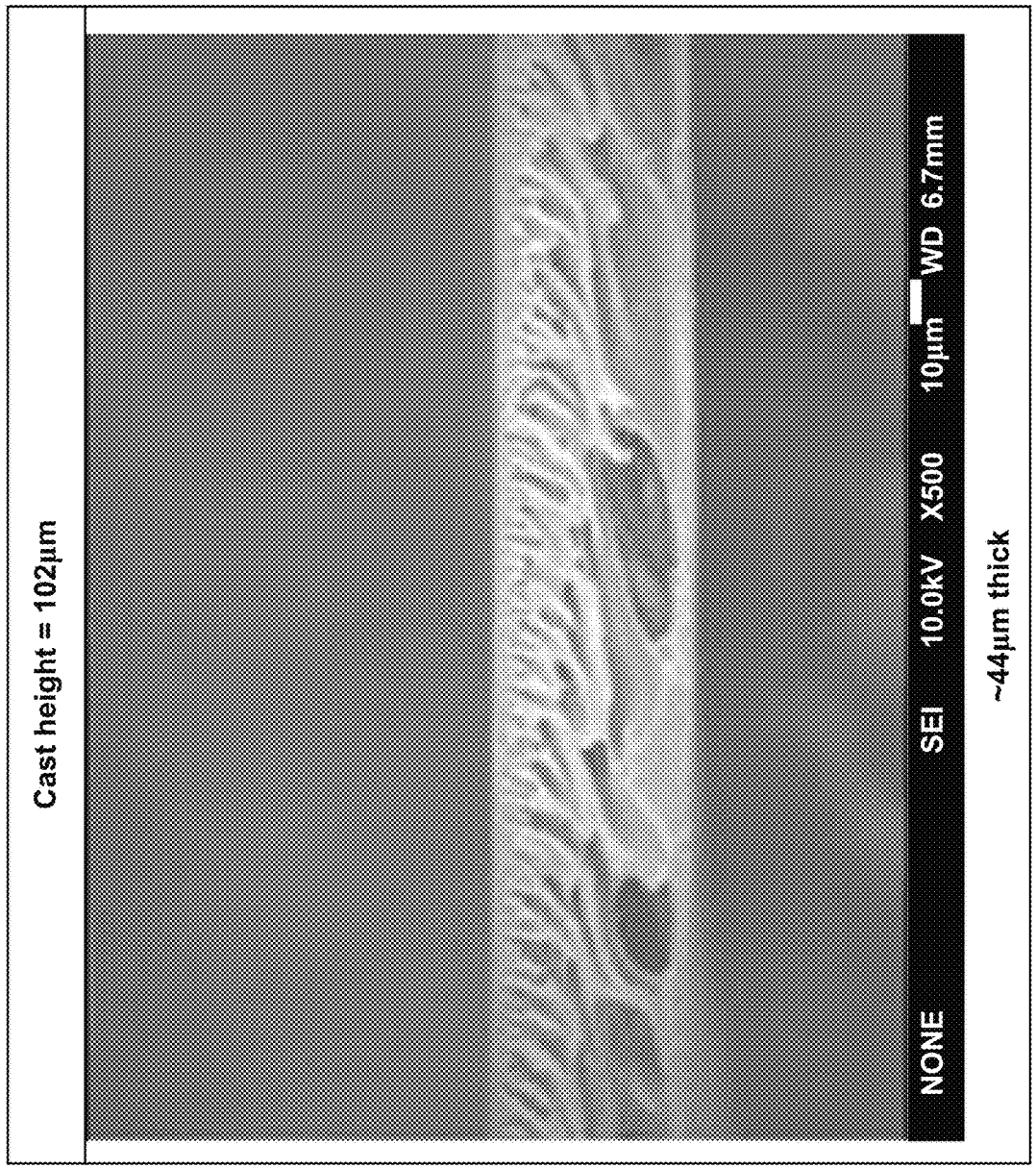
Figures 1, 10B:
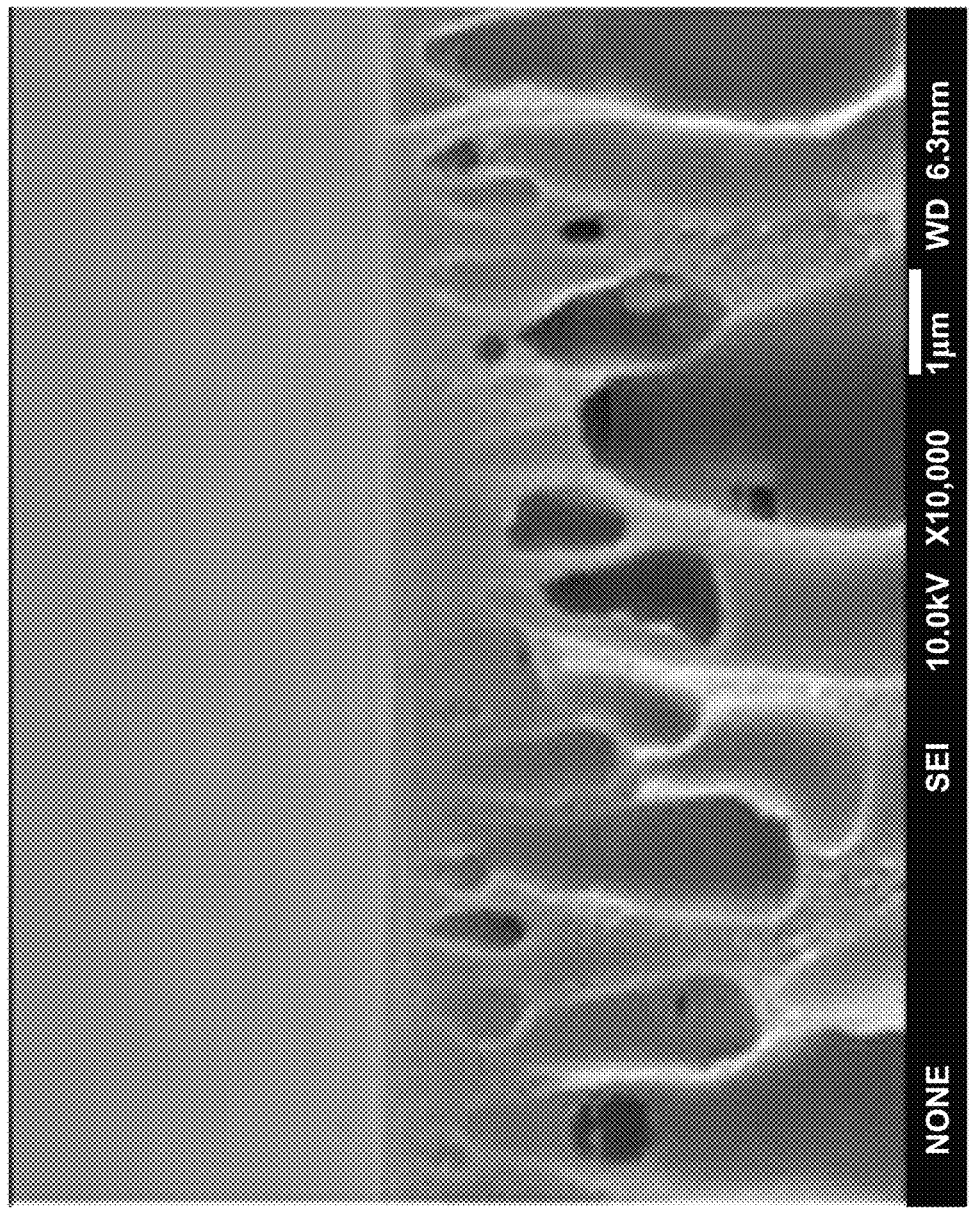
Figures 2, 10B:
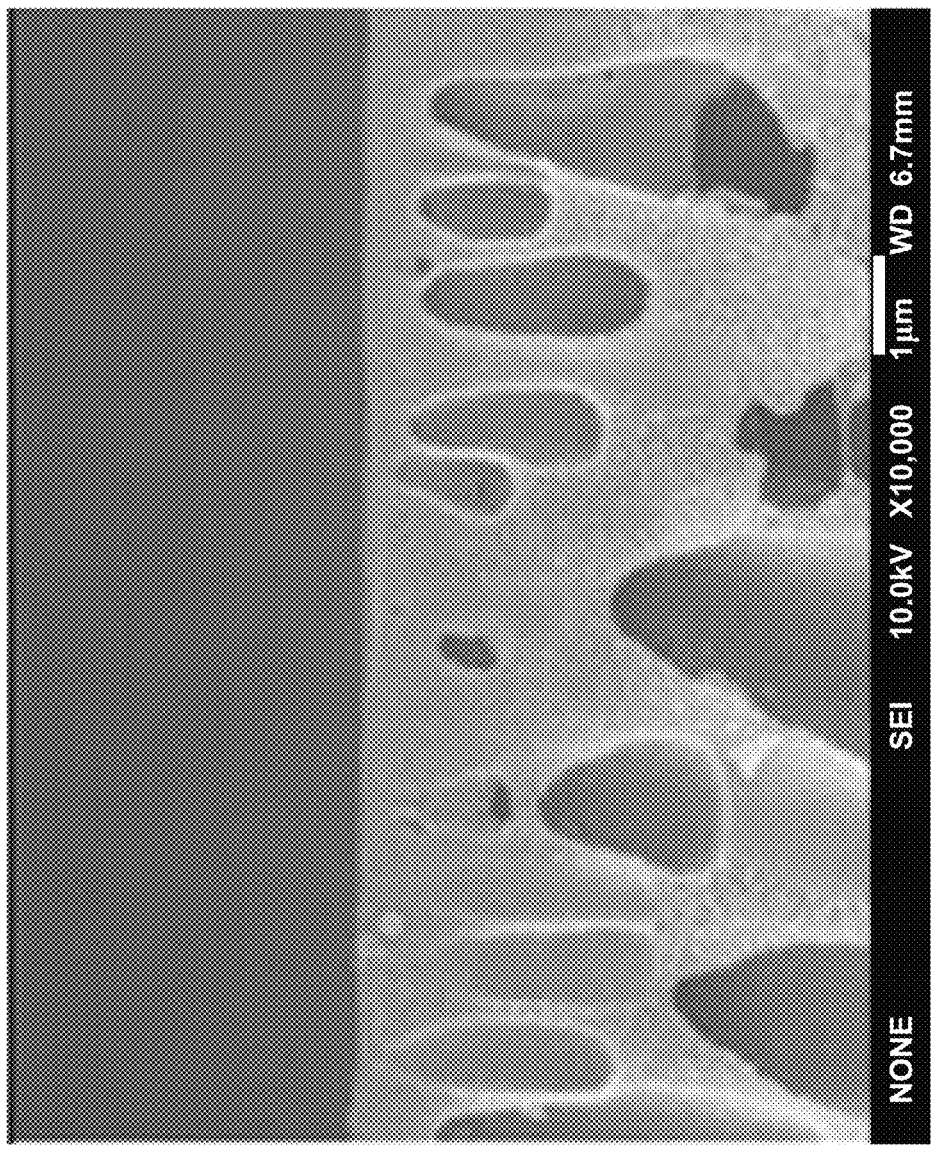

PANi membranes with two different casting blade heights (152 μm and 102 μm) were made (12 wt % PANi (65 kDa from SFST) in NMP with 4-MP; coagulation bath=room temperature water). Various post-treatments were used. See FIG. 8, FIG. 9, and FIG. 10.

Membranes formed using a casting blade height of 102 µm begin to exhibit non-uniformities on the membrane surface due to contact with the roughness of the fabric.

Decreasing demixing rate, and decreasing the temperature of the coagulation bath (20° C. and 15° C.) do not seem to affect membrane performance.

Figure 11:
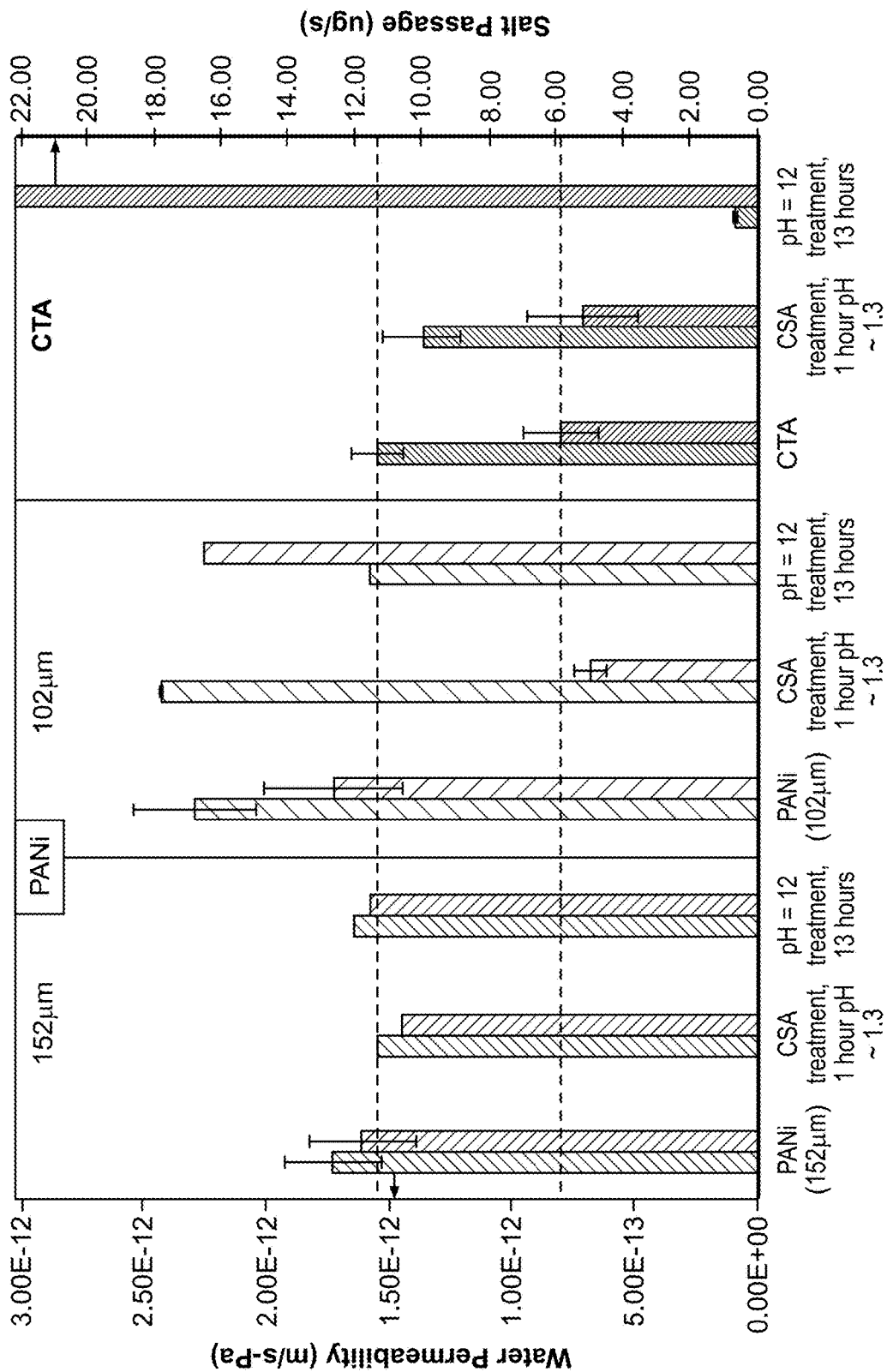
FIG. 11 depicts the water permeability (A), in m/S Pa (left bar), and salt passage, in μg/s (right bar), of various membranes with or without post-treatment, and having different casting blade heights. The experiments were run in FO mode (draw solution=32 g/L NaCl; feed solution=DI water; room temperature (about 23° C.)). Post-treatments: CSA treatment=100 mM CSA, pH~1.3, 1 h; NaOH treatment=pH 12, 13 h.

The membranes cast using different blade heights were subject to various post-treatments. As is shown in FIG. 11, the CSA treatment seems to make the membrane cast at 102 µm permeable and more selective to NaCl (exceeding CTA performance). Two different membranes cast on two different days were tested, and similar results were obtained, showing reproducibility.

Figure 4:
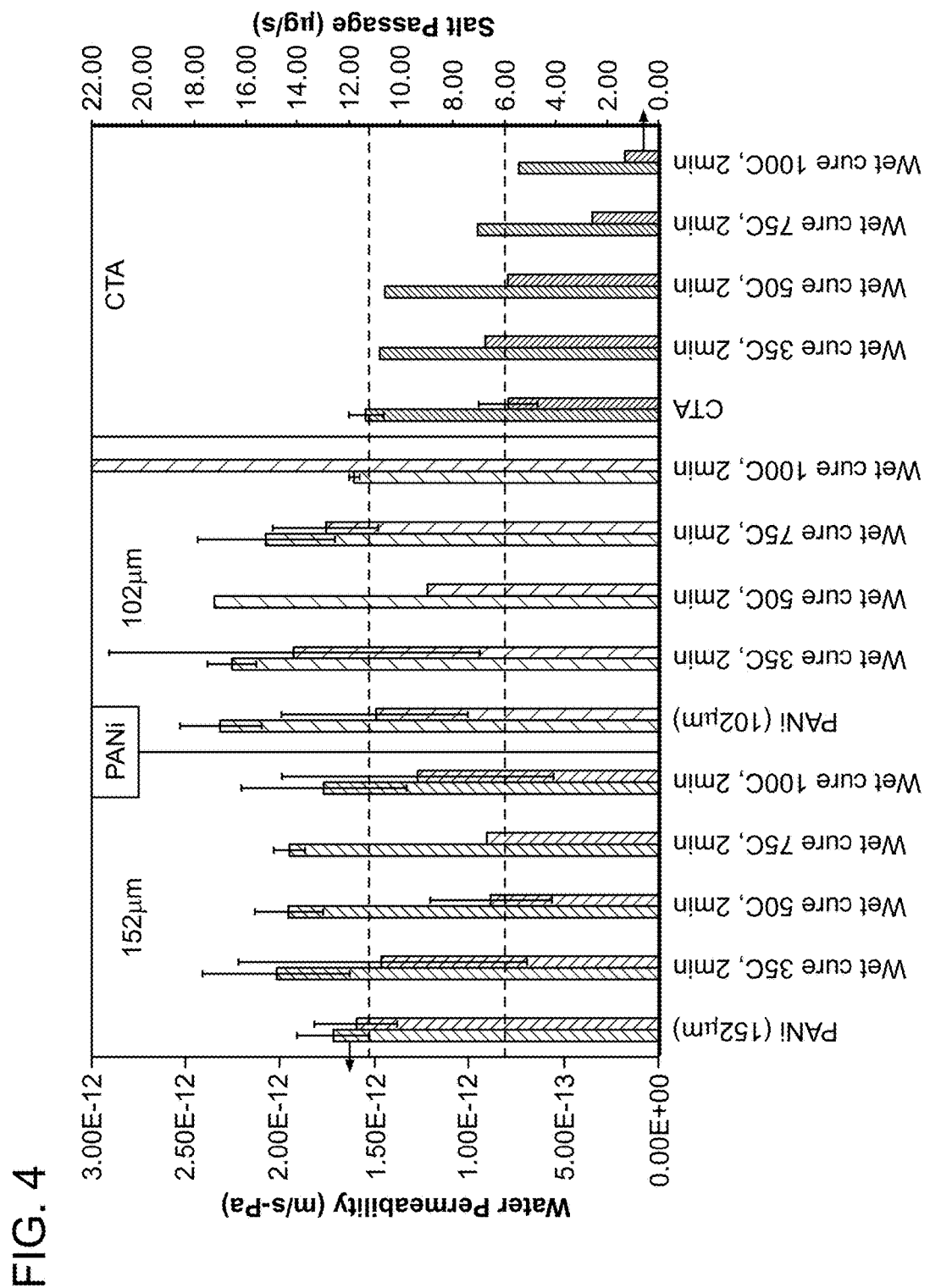
FIG. 4 depicts the water permeability (A), in m/S Pa (left bar), and salt passage, in μg/s (right bar), of various membranes with or without post-treatment, made with different casting blade heights. The experiments were run in FO mode (draw solution=32 g/L NaCl; feed solution=DI water; 20° C.; flowrates=0.1 gpm). Post-treatment: wet cure=water bath at specified temperature for 2 min.

The membranes cast using different blade heights were subject to various wet-cure conditions. As is shown in FIG. 4, it seems are though the CTA membrane is not as thermally stable as the PANi membrane. Interestingly, the membrane casted at 152 µm becomes much more selective under heat treatment than the one cast at 102 µm, and even more permeable to water. From the cross-sectional SEM images (FIG. 10), there are no significant differences morphologically except the thicknesses of the membrane.

The membrane cast at 102 µm exceeds CTA performance after CSA treatment for 1 hour. The membrane cast at 152 µm can achieve approximately CTA performance (with slightly higher water permeability) after wet curing at 75° C. for 2 mins.

A summary of performance data for membranes cast with different blade heights may be found in Table 4.

TABLE 4

| Membrane | Post-Treatment | Water Permeability (m/s-Pa) | NaCl Permeability (m/s) |
|---|---|---|---|
| PANi-152 | None | $1.28 \times 10^{-9}$ | $1.59 \times 10^{-3}$ |
|  | 0.1M HCl, 1 hr | $1.50 \times 10^{-9}$ | $4.21 \times 10^{-3}$ |
| PANi-102 | None | $1.42 \times 10^{-9}$ | $4.90 \times 10^{-3}$ |
|  | 0.1M CSA, 1 hr | $1.23 \times 10^{-9}$ | $2.13 \times 10^{-3}$ |

INCORPORATION BY REFERENCE

All of the academic publications, U.S. patents, and U.S. published patent applications cited herein are hereby incorporated by reference in their entireties.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A forward osmosis membrane, wherein the membrane consists essentially of a porous support material and a polymer layer; the polymer layer comprises a skin layer and a sublayer; the skin layer comprises a plurality of pores; the sublayer comprises a plurality of macrovoids; the polymer layer is polyaniline and a dopant, wherein the dopant is an camphor sulfonic acid; and the thickness of the polymer layer is from 20 µm to 120 µm.

2. The membrane of claim 1, wherein the polyaniline is leucoemeraldine polyaniline, emeraldine polyaniline, or pernigraniline polyaniline.

3. The membrane of claim 1, wherein the molecular weight of the polyaniline is from about 30 kDa to about 100 kDa.

4. The membrane of claim 1, wherein the porous support material is a fabric.

5. The membrane of claim 1, wherein the water permeability of the membrane is greater than about $1.5 \times 10^{12}$ m/s·Pa.

6. The membrane of claim 1, wherein the salt passage of the membrane is less than about 16 µg/s.

7. The membrane of claim 1, wherein the pure water equilibrium contact angle of the membrane is less than about 90°.

8. A method of forming the membrane of claim 1, comprising:
   a. coating a first composition comprising polyaniline and a polyaniline solvent onto a porous support material; and
   b. contacting the porous support material coated with the first composition with a polyaniline nonsolvent, thereby forming the membrane.

9. The method of claim 8, wherein the polyaniline solvent is selected from N-methyl-2-pyrrolidone and 4-methylpiperidine, and mixtures thereof.

10. The method of claim 8, wherein the concentration of polyaniline in the polyaniline solvent is from about 6 wt % to about 18 wt %.

11. The method of claim 8, wherein the polyaniline is leucoemeraldine polyaniline, emeraldine polyaniline, or pernigraniline polyaniline.

12. The method of claim 8, wherein the molecular weight of the polyaniline is from about 30 kDa to about 100 kDa.

13. The method of claim 8, wherein the porous support material is a fabric.

14. The method of claim 8, wherein the polyaniline nonsolvent is water.

15. A forward osmosis method comprising passing a liquid composition through the membrane of claim 1, wherein the liquid composition comprises a solute and a solvent; and the membrane is substantially impermeably to the solute.

16. The method of claim 15, wherein the liquid composition is salt water.

17. The method of claim 15, wherein the liquid composition is brackish water.

18. The method of claim 15, wherein the solute is a pathogen or a toxin.

19. A forward osmosis membrane, wherein the membrane consists essentially of a porous support material and a polymer layer; the polymer layer is polyaniline and a dopant, wherein the dopant is an camphor sulfonic acid; the thickness of the polymer layer is from 20 µm to about 120 µm, and wherein the membrane is prepared by:
   a) coating a first composition comprising polyaniline and a polyaniniline solvent onto a porous support material; and
   b) contacting the porous support material coated with the first composition with a polyaniline nonsolvent thereby forming the membrane, wherein the concentration of polyaniline in the polyaniline solvent is from 6 wt % to 18 wt %.

20. The membrane of claim 19, wherein the polyaniline is leucoemeraldine polyaniline, emeraldine polyaniline, or pernigraniline polyaniline.

21. The membrane of claim 19, wherein the molecular weight of the polyaniline is from about 30 kDa to about 100 kDa.

22. The membrane of claim 19, wherein the porous support material is a fabric.

23. The membrane of claim 19, wherein the water permeability of the membrane is greater than about $1.5 \times 10^{-12}$ m/s·Pa.

24. The membrane of claim 19, wherein the salt passage of the membrane is less than about 16 μg/s.

25. The membrane of claim 19, wherein the pure water equilibrium contact angle of the membrane is less than about 90°.

\* \* \* \* \*

UNITED STATES PATENT AND TRADEMARK OFFICE
CERTIFICATE OF CORRECTION

PATENT NO.        : 10,456,755 B2                                        Page 1 of 1
APPLICATION NO.   : 14/891010
DATED             : October 29, 2019
INVENTOR(S)       : Eric M. V. Hoek et al.

It is certified that error appears in the above-identified patent and that said Letters Patent is hereby corrected as shown below:

In the Claims

In Claim 5, Column 14, Line 10, cancel the text:
"$1.5 \times 10^{12}$"
And insert:
--$1.5 \times 10^{-12}$--

Signed and Sealed this
Seventh Day of July, 2020

Andrei Iancu
*Director of the United States Patent and Trademark Office*